United States Patent
Wei et al.

(10) Patent No.: US 8,745,297 B2
(45) Date of Patent: Jun. 3, 2014

(54) LOAD CARD FOR TESTING PERIPHERAL COMPONENT INTERCONNECT SLOTS

(75) Inventors: Chao-Ke Wei, New Taipei (TW); Bo Tian, Shenzhen (CN); Ze-Yun Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 246 days.

(21) Appl. No.: 13/337,063

(22) Filed: Dec. 24, 2011

(65) Prior Publication Data

US 2013/0103879 A1   Apr. 25, 2013

(30) Foreign Application Priority Data

Oct. 24, 2011  (CN) .......................... 2011 1 0325632

(51) Int. Cl.
*H05K 7/10* (2006.01)

(52) U.S. Cl.
USPC .......................................................... 710/301

(58) Field of Classification Search
USPC .......................................................... 710/301
See application file for complete search history.

(56) References Cited

U.S. PATENT DOCUMENTS

| | | | | |
|---|---|---|---|---|
| 4,885,482 A * | 12/1989 | Sharp et al. | ...................... | 326/47 |
| 5,162,675 A * | 11/1992 | Olsen et al. | ...................... | 326/37 |
| 5,884,053 A * | 3/1999 | Clouser et al. | ................ | 710/312 |
| 5,911,050 A * | 6/1999 | Egan et al. | .................... | 710/100 |
| 5,930,496 A * | 7/1999 | MacLaren et al. | .............. | 703/23 |
| 6,111,757 A * | 8/2000 | Dell et al. | ...................... | 361/737 |
| 6,146,150 A * | 11/2000 | Roberts | ........................... | 439/55 |
| 6,269,416 B1 * | 7/2001 | Meier et al. | .................... | 710/301 |
| 6,327,635 B1 * | 12/2001 | Alston et al. | ................... | 710/301 |
| 6,421,798 B1 * | 7/2002 | Lin et al. | ....................... | 714/718 |
| 6,434,648 B1 * | 8/2002 | Assour et al. | ................. | 710/305 |
| 6,532,558 B1 * | 3/2003 | Allen et al. | .................... | 714/724 |
| 6,890,188 B1 * | 5/2005 | Le | ................ | 439/76.1 |
| 6,908,038 B1 * | 6/2005 | Le | ................ | 235/492 |
| 7,085,939 B2 * | 8/2006 | Cabezas et al. | .............. | 713/300 |
| 7,152,801 B2 * | 12/2006 | Cuellar et al. | ................ | 235/492 |
| 7,218,528 B2 * | 5/2007 | Chen | ............................. | 361/737 |
| 7,256,517 B2 * | 8/2007 | Jablonski et al. | ............. | 307/75 |
| 7,364,090 B2 * | 4/2008 | Cuellar et al. | ................ | 235/492 |
| 7,783,464 B2 * | 8/2010 | You et al. | ........................ | 703/14 |
| 7,996,175 B2 * | 8/2011 | Xiong | ............................ | 702/117 |
| 8,291,144 B2 * | 10/2012 | Pinto et al. | ..................... | 710/301 |
| 2007/0032998 A1 * | 2/2007 | You et al. | ........................ | 703/14 |
| 2009/0164695 A1 * | 6/2009 | Xiong | ............................ | 710/316 |

FOREIGN PATENT DOCUMENTS

| | | |
|---|---|---|
| TW | 530198 | 5/2003 |
| TW | 200817693 | 4/2008 |
| TW | M329814 | 4/2008 |

* cited by examiner

*Primary Examiner* — Paul R Myers
(74) *Attorney, Agent, or Firm* — Novak Druce Connolly Bove + Quigg LLP

(57) ABSTRACT

A load card for testing different types of PCI slots is provided. The load card includes several gold fingers, and resistor selection circuits. Each gold finger corresponds to one PCI slot. Each resistor selection circuit includes a resistor to test at least one PCI slot working in one working voltage. When a PCI slot working at a working voltage is to be tested, the gold finger connects to the PCI slot, and the resistor selection circuit including the resistor to test the PCI slot working at the working voltage is enabled and others are disabled in response to an operation of the user.

7 Claims, 3 Drawing Sheets

LOAD CARD FOR TESTING PERIPHERAL COMPONENT INTERCONNECT SLOTS

BACKGROUND

1. Technical Field

The present disclosure relates to load cards and, particularly, to a load card for testing Peripheral Component Interconnect (PCI) slots.

2. Description of Related Art

Electronic devices, such as computers, should be tested before being sold to customers. One of the most important tests is to test the performance of Peripheral Component Interconnect (PCI) slots of the motherboard. Usually, one motherboard has different types of PCI slots, such as, PCI slot, PCI Express (PCI-E) slot, PCI-extended (PCI-X) slots. Each type of the PCI slots are tested by using a corresponding load card. Therefore, it is needed to provide many different load cards to test the PCI slots of the motherboard, which is inconvenient for the tester.

Therefore, it is desirable to provide a load card for testing the different type of PCI slots to overcome the described limitations.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
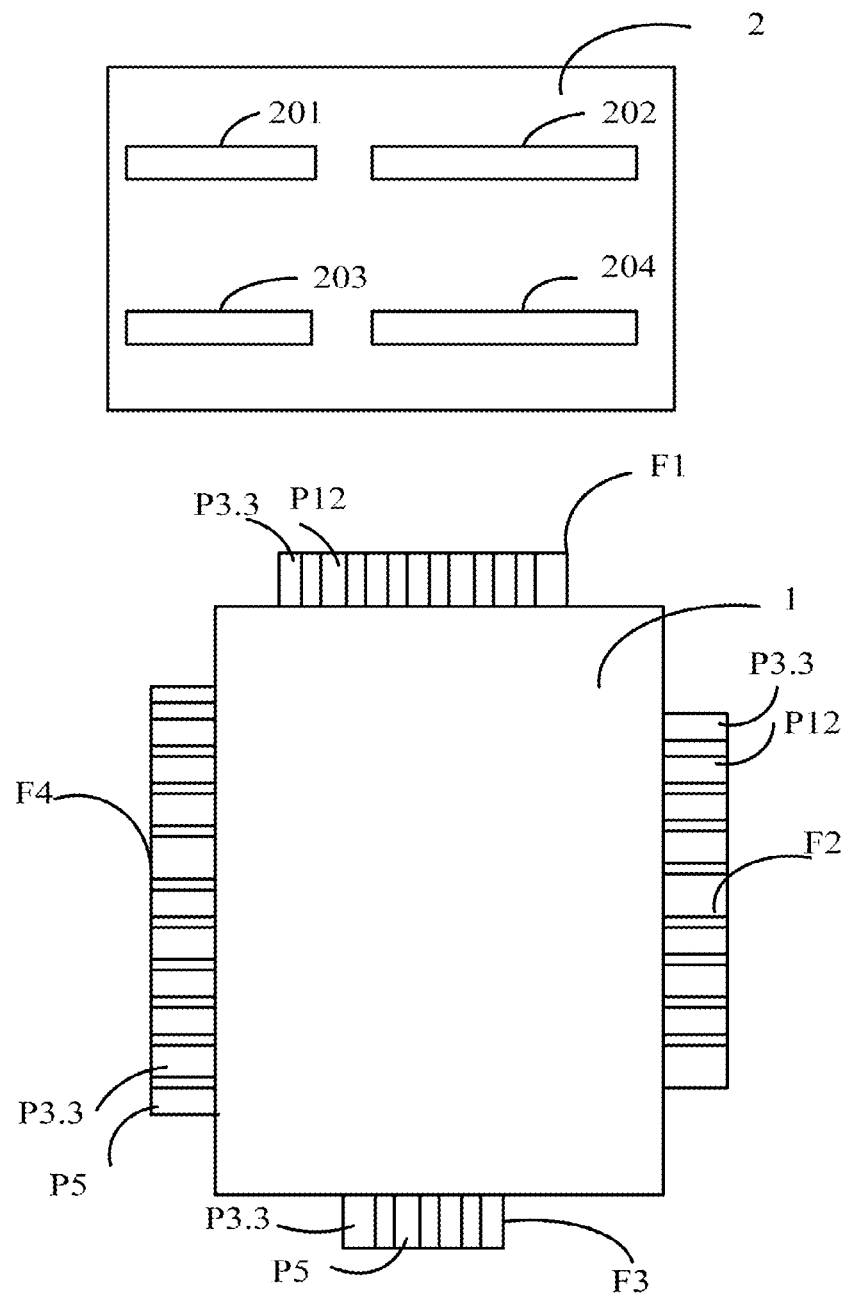
FIG. 1 is an aspect diagram of a load card for testing PCI slots, together with a motherboard, in accordance with an exemplary embodiment.

FIG. 1, is a load card 1 for testing PCI slots (hereinafter, "the load card 1") includes a number of gold fingers F1-F4, in the embodiment, the load card 1 is a rectangle and the number of the gold fingers F1-F4 are four, each side of the load card 1 has one gold finger F1-F4. Each gold finger matches one of PCI slots 201-204 of a motherboard 2. When one of the PCI slot 201-204 of the motherboard 2 needs to be tested, the load card 1 is connected to the PCI slot via the corresponding gold finger in response to an operation of a user. In the embodiments, the PCI slots 201-204 of the motherboard 2 are a PCI-E x8 slot 201, a PCI-E x16 slot 202, a PCI slot 203, and a PCI-X slot 204. The PCI-E x8 slot 201 corresponds to the gold finger F1, the PCI-E x16 slot 202 corresponds to the gold finger F2, the PCI slot 203 corresponds to the gold finger F3, and the PCI-X slot 204 corresponds to the gold finger F4.

Figure 2:
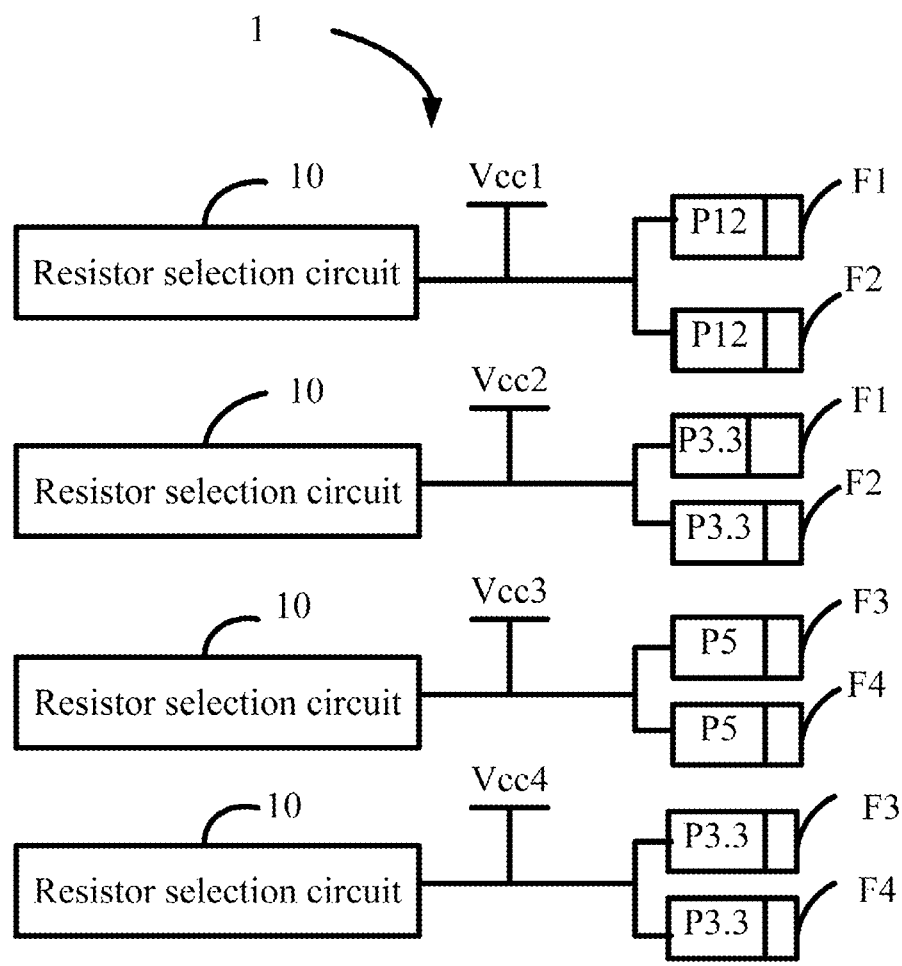
FIG. 2 is a block diagram of the load card of FIG. 1.

FIG. 2, the load card 1 includes four voltage ports Vcc1-Vcc4, and four resistor selection circuits 10. In this embodiment, each PCI slot has two different working voltages, thus, there is a need to provide a different test resistor to test the PCI slot with the different working voltages. In this embodiment, the PCI-E x8 slot 201 and the PCI-E x16 slot 202 are regarded as similar slots, the PCI slot 203 and the PCI-X slot 204 are also regarded as similar slots, thus, the two working voltages of the PCI-E x8 slot 201 are the same as the PCI-E x16 slot 202, and the two working voltages of the PCI slot 203 are the same as the PCI-X slot 204, thus, the PCI-E x8 slot 201 and the PCI-E x16 slot 202 are regarded as similar slots, the PCI slot 203 and the PCI-X slot 204 are also regarded as similar slots. Similar PCI slots and have the same two working voltages and need the same resistors to test the PCI-E x8 slot 201 to test the PCI-E x16 slot 202, and the same resistors that test the PCI slot 203 can be also used to test the PCI-X slot 204.

In detail, the two working voltages of the PCI-E x8 slot 201 and the PCI-E x16 slot 202(hereinafter, "the first two working voltages") are 12 volts and 3.3 volts respectively, and the two working voltages of the PCI slot 203 and the PCI-X slot 204 (hereinafter, "the second two working voltages") are 5 volts and 3.3 volts respectively. The four voltage ports Vcc1-Vcc4 of the load card 1 are used to receive the first two working voltages and the second two working voltages respectively, i.e., the 12 volts, the 3.3 volts, the 5 volts and the 3.3 volts respectively.

In detail, due to the PCI-E x8 slot 201 and the PCI-E x16 slot 202 being similar slots, and the PCI slot 203 and the PCI-X slot 204 being similar slots, each gold finger includes two voltage pins, the two gold fingers corresponding to the two similar PCI slots have the same two power pins, one of the four voltage ports Vcc1-Vcc4 is connected to the same power pin of the gold fingers corresponding to the similar PCI slots.

For example, as shown in FIG. 1, the voltage port Vcc1 is connected to a power pin P12 of the gold finger F1 and the gold finger F2, the voltage port Vcc2 is connected to a power pin P3.3 of the gold finger F1 and the gold finger F2, the voltage port Vcc3 is connected to a power pin P5 of the gold finger F3 and the gold finger F4, the voltage port Vcc4 is connected to a power pin P3.3 of the gold finger F3 and the gold finger F4. In the embodiment, the power pin P3.3 of the gold finger F1 and the power pin P3.3 of the gold finger F2 are used to receive 3.3 volts from the PCI-E x8 slot 201 and the PCI-E x16 202 respectively, the power pin P12 of the gold finger F1 and the power pin P12 of the gold finger F2 are used to receive 12 volts from the PCI-E x8 slot 201 and the PCI-E x16 202 respectively. The power pin P3.3 of the gold finger F3 and the power pin P3.3 of the gold finger F4 are used to receive 3.3 volts from the PCI slot 203 and the PCI-X slot 204 respectively, and the power pin P5 of the gold finger F3 and the power pin P5 of the gold finger F4 are used to receive 5 volts from the PCI slot 203 and the PCI-X slot 204 respectively. Then, the four voltage ports Vcc1-Vcc4 of the load card 1 can receive the 12 volts, the 3.3 volts, the 5 volts, and the 3.3 volts, respectively.

Each resistor selection circuit 10 is connected to a different one of the four voltage ports Vcc1-Vcc4, and each resistor selection circuit 10 includes a resistor which is used to test the similar PCI slots working with one voltage. For example, the resistor selection circuit 10 connected to the voltage port Vcc1 includes the resistor which is used to test the PCI-E x8 and the PCI-E x16 working with 12 volts, the resistor selection circuit 10 connected to the voltage port Vcc2 includes the resistor which is used to test the PCI-E x8 slot 201 and the PCI-E x16 202 slot working with 3.3 volts; the resistor selection circuit 10 connected to the voltage port Vcc3 includes the resistor which is used to test the PCI slot 203 and the PCI-X slot 204 working with 5 volts, and the resistor selection circuit 10 connected to the voltage port Vcc4 includes the resistor which is used to test the PCI slot 203 and the PCI-X slot 204 working with 3.3 volts.

In the embodiment, the four resistor selection circuits 10 are at an enable state or a disable state in response to the operation of the user. In the embodiment, the four resistor selection circuits 10 have the same structure except that the resistance value of the resistor of different resistor selection circuit 10 is different. For simplicity, only one resistor selection circuit 10 is used to describe the present disclosure.

Figure 3:
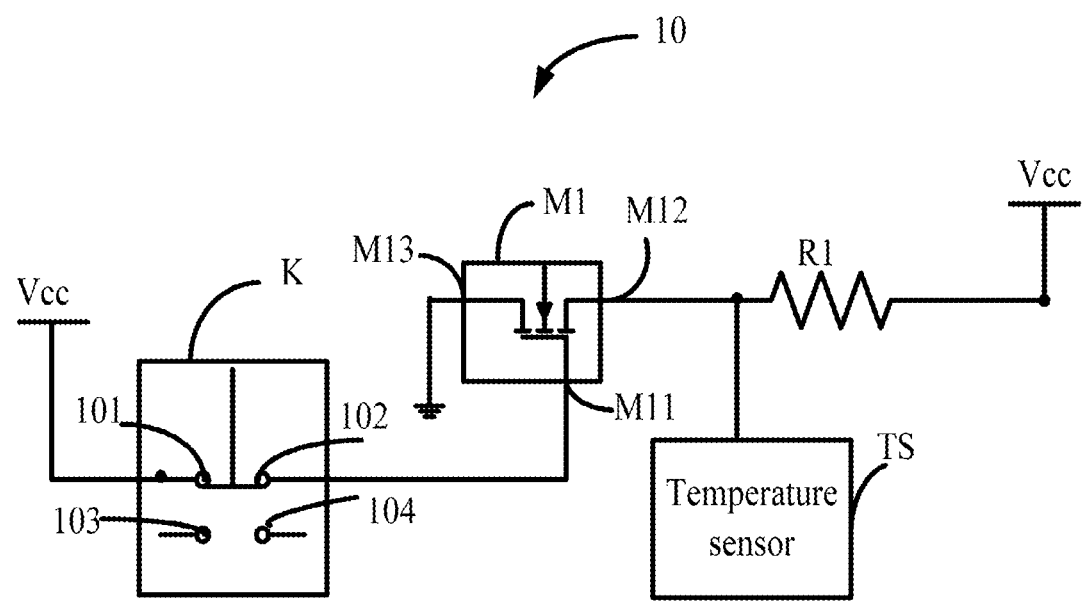
FIG. 3 is a circuit diagram of a resistor selection circuit of the load card for testing PCI slots of FIG. 1.

FIG. 3, is the resistor selection circuit 10 including an operable switch K, a path switches M1, and a resistor R1. The operable switch K includes four connection terminals 101-104, and the path switch M1 includes a control terminal M11, a first path terminal M12, and a second path terminal M13. The connection terminal 101 of the operable switch K is connected to a voltage port Vcc, in the embodiment, the voltage port Vcc is one of the four voltage port Vcc1-Vcc4. The connection terminal 102 is connected to the control terminal M11 of the path switch M1, and the connection terminals 103, 104 are opened. The resistor R1 is connected between the voltage port Vcc and the first path terminal M12 of the path switch M1, and the second path terminal M13 is grounded.

The operable switch K is a multi-way switch and can be operated by the user to either connect the connection terminal 101 with the connection terminal 102, or connect the connection terminal 103 with the connection terminal 104.

When the operable switch K is operated to connect the connection terminal 101 with the connection terminal 102, the control terminal M11 of the path switch M1 obtains a high voltage from the voltage port Vcc to cause the path switch M1 to turn on, then the resistor selection circuit 10 is enabled and the resistor R1 is selected as the test resistor, and current flows through the first resistor R1. When the operable switch K connects the connection terminal 103 to the connection terminal 104, the path switch M1 is turned off, and the resistor selection circuit 10 is disabled.

In the embodiment, each resistor selection circuit 10 also includes a temperature sensor TS, and the temperature sensor TS is connected to the resistor R1. The temperature sensor TS is used to detect the temperature of the resistor R1 when there is current flowing through the first resistor and produce a temperature parameter reflecting the performance of the corresponding PCI slot.

Therefore, if one PCI slot working at a working voltage needs to be tested, the resistor selection circuit 10 corresponding to the PCI slot working at the working voltage can be enabled, and the other resistor selection circuits 10 is disabled. Then the load card 1 can be used to test multiple PCI slots, such as the PCI-E x8 slot 201, the PCI-E x16 slot 202, the PCI slot 203, and the PCI-X slot 204 described above.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A load card for testing different types of PCI slots, each type of the PCI slot having two working voltages, the load card comprising:
a plurality of gold fingers, each gold finger corresponds to one type of the PCI slots, and each gold finger having two power pins to receive the two working voltages of a corresponding PCI slot respectively;
a plurality of voltage ports, wherein each voltage port connects to one power pin of one of the plurality of the gold fingers and receives a working voltage when the one gold finger connects to one PCI slot working at the working voltage; and
a plurality of resistor selection circuits, each of which is connected to one of the voltage ports;
wherein, each of the resistor selection circuits further comprises:
a path switch comprising a control terminal, a first path terminal, and a second path terminal which is grounded;
an operable switch comprising a first connection terminal, a second connection terminal, a third connection terminal, and a fourth connection terminal, wherein, the first connection terminal is connected to corresponding voltage port, the second connection terminal is connected to the control terminal of the path switch, the third connection terminal and the fourth connection terminal are opened;
a resistor connected between the voltage port and the first path terminal of the path switch and configured to test one of the PCI slots working at one working voltage; and
a temperature sensor connected to the resistor, configured to detect the temperature of the resistor;
wherein, each resistor selection circuit switches between an enabled state and a disabled state, when one of the PCI slots working at a working voltage is to be tested, the gold finger connects to the PCI slot, the corresponding voltage port receives the working voltage, and the resistor selection circuit comprising the resistor to test the PCI slot working at the working voltage is enabled and other resistor selection circuits are disabled, in response to the user operation.

2. The load card according to claim 1, wherein the operable switch is a multi-way switch and is configured to connect the first connection terminal with the second connection terminal, or connect the third connection terminal with the fourth connection terminal in response to the user operation.

3. The load card according to claim 2, wherein the path switch is a high voltage activated switch, when the operable switch connects the first connection terminal with the second connection terminal in response to the user operation, the control terminal of the path switch obtains a high voltage from the voltage port to cause the path switch to turn on, then the resistor selection circuit is enabled and the resistor is selected, and causing a current flows through the resistor, the temperature sensor then detects the temperature of the resistor and produce a temperature parameter reflecting the performance of the PCI slot to be tested; when the operable switch connects the third connection terminal with the fourth connection terminal in response to the user operation, the path switch is turned off, and the resistor selection circuit is disabled.

4. The load card according to claim 1, wherein the resistance value of the resistor of different resistor selection circuit is different.

5. The load card according to claim 1, wherein the PCI slots comprise a PCI-E x8 slot, a PCI-E x16 slot, a PCI slot, and a PCI-X slot, and the gold fingers comprises a first gold finger, a second gold finger, a third finger, and a fourth finger respectively corresponding to the PCI-E x8 slot, the PCI-E x16 slot, the PCI slot.

6. The load card according to claim 5, wherein the two working voltages of the PCI-E x8 slot and the PCI-E x16 slot are the same and are 12 volts and 3.3 volts respectively, the two working voltages of the PCI slot and the PCI-X slot are the same and are 5 volts and 3.3 volts, and the voltage ports comprise a first voltage port, a second voltage port, a third voltage port, and a fourth voltage port respectively for receiving 12 volts, 3.3 volts, 5 volts and 3.3 volts.

7. The load card according to claim 6, wherein a first power pin of the first gold finger and a first power pin of the second gold finger are configured to receive 12 volts from the PCI-E x8 slot and the PCI-E x16 respectively, a second power pin of the first gold finger and a second power pin of the second gold finger are configured to receive 3.3 volts from the PCI-E x8 slot and the PCI-E x16 respectively; a first power pin of the third gold finger and a first power pin of the fourth gold finger are configured to receive 5 volts from the PCI slot and the PCI-X slot respectively, and a second power pin of the third gold finger and a second power pin of the fourth gold finger are configured to receive 3.3 volts from the PCI slot and the PCI-X slot respectively; the first voltage port is connected to the first power pin of the first gold finger and the second gold finger, the second voltage port is connected to the second power pin of the first gold finger and the second gold finger, the third voltage port is connected to the first power pin of the third gold finger and the fourth gold finger, the fourth voltage port is connected to the second power pin of the third gold finger and the fourth gold finger.

* * * * *